No. 689,803. Patented Dec. 24, 1901.
C. HERMANN.
ATTACHMENT FOR MOWING MACHINES.
(Application filed Nov. 21, 1900.)

(No Model.) 2 Sheets—Sheet 1.

WITNESSES:
Geo. Ackman.
F. O. McCleary.

INVENTOR:
Charles Hermann.
BY
Victor J. Evans
ATTORNEY.

No. 689,803. Patented Dec. 24, 1901.
C. HERMANN.
ATTACHMENT FOR MOWING MACHINES.
(Application filed Nov. 21, 1900.)
(No Model.) 2 Sheets—Sheet 2.
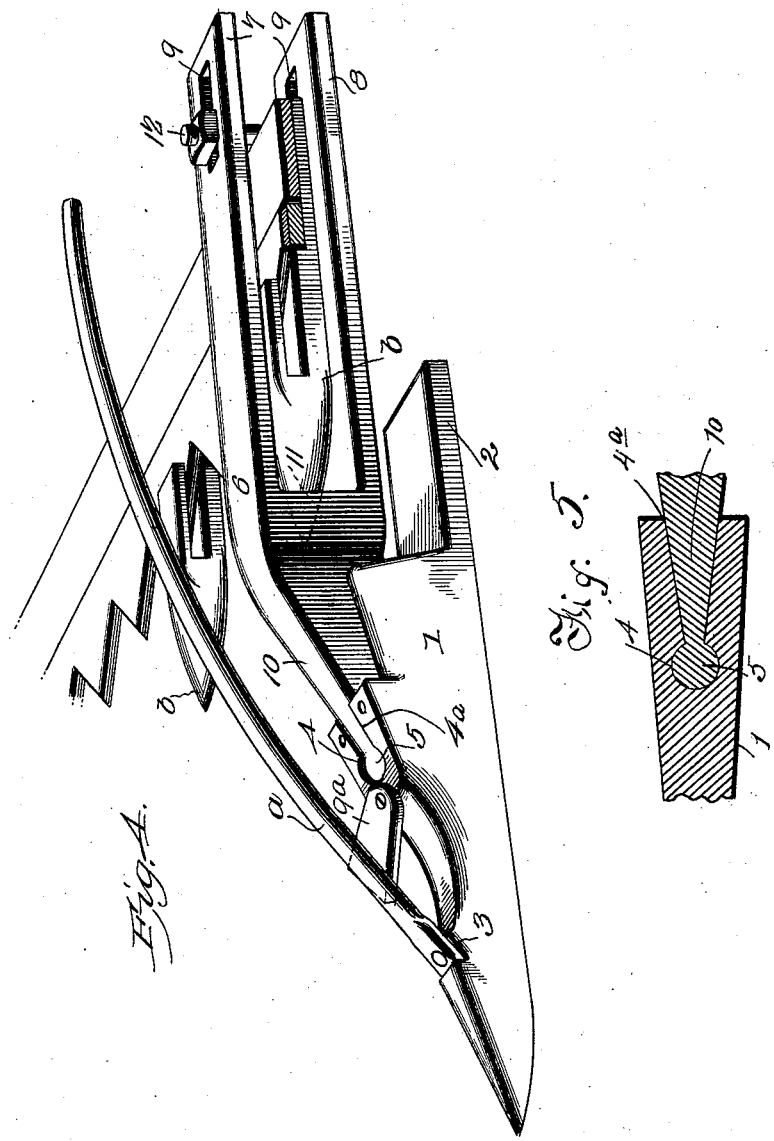

UNITED STATES PATENT OFFICE.

CHARLES HERMANN, OF STURGEON BAY, WISCONSIN.

ATTACHMENT FOR MOWING-MACHINES.

SPECIFICATION forming part of Letters Patent No. 689,803, dated December 24, 1901.

Application filed November 21, 1900. Serial No. 37,248. (No model.)

*To all whom it may concern:*

Be it known that I, CHARLES HERMANN, a citizen of the United States, residing at Sturgeon Bay, in the county of Door and State of Wisconsin, have invented new and useful Improvements in Attachments for Mowing-Machines, of which the following is a specification.

My invention is an improved vine-lifting attachment for mowing-machines adapted to operate in advance of the cutting apparatus to lift the vines of peas or beans from the ground and enable the same to be cut by the mower; and it consists in the peculiar construction and combination of devices hereinafter fully set forth and claimed.

Figure 1:
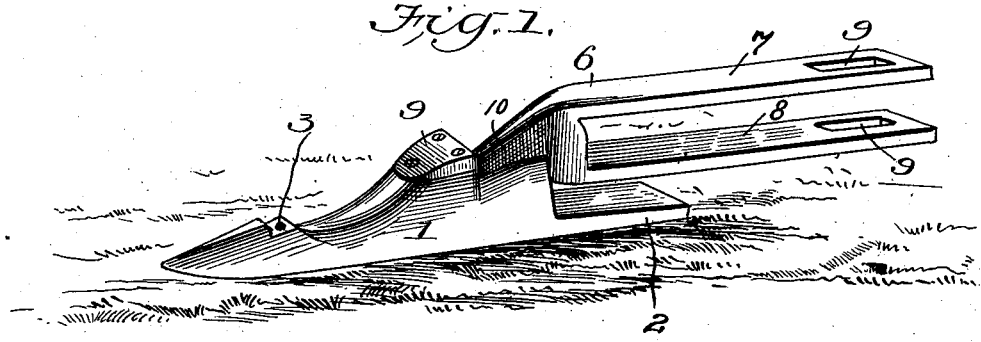
Figure 2:
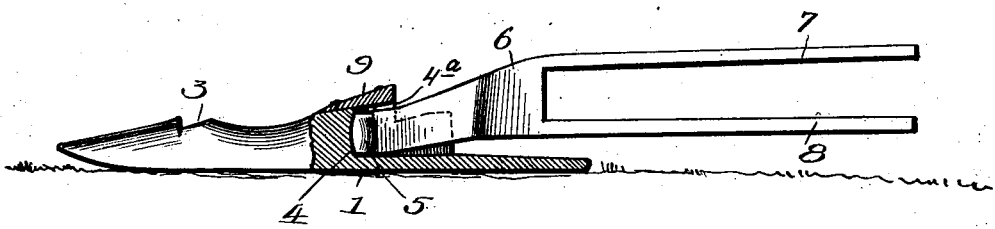
Figure 3:
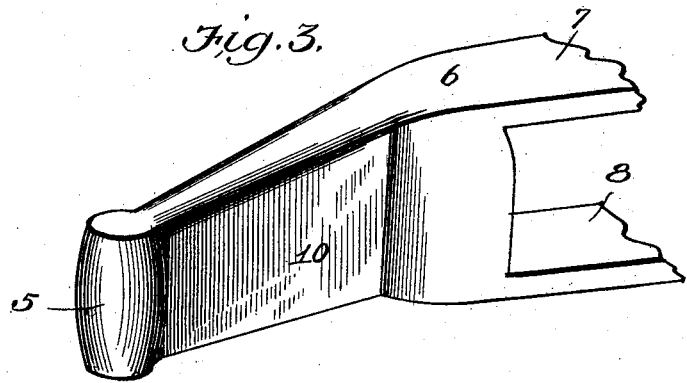

In the accompanying drawings, Figure 1 is a perspective view of a vine-lifting attachment constructed in accordance with my invention, the lifting-bar being omitted. Fig. 2 is a side elevation of the same, partly in section. Fig. 3 is a perspective view of the front end of the shoe-supporting arm, showing the knob on the front end thereof. Fig. 4 is a perspective view showing my improved attachment in operative position with relation to the cutting apparatus of a mowing-machine. Fig. 5 is a detail horizontal sectional view taken through the knuckle-joint.

In the embodiment of my invention I provide a shoe 1, which is adapted to run on the ground in advance of a finger of a mowing-machine and in line therewith. The front end of the shoe is pointed, as shown, and its lower side is upturned at its front end, as shown, to adapt the shoe to run readily on the surface of the ground and prevent the point of the shoe from becoming embedded in the ground. On the upper side of the shoe, near the front end thereof, is a recess 3, in which is secured the front end of a lifting-bar $a$, that is curved, as shown in Fig. 4. At the rear end of the shoe is formed an arm 2, which is a rearward extension of the shoe and which is flattened on its upper and lower sides, as shown. In the upper side of the shoe, at a suitable distance from the rear end thereof, is a recess 4, which forms the socket of a knuckle-joint, hereinafter described, and the said shoe is provided with a longitudinal slot $4^a$ of suitable depth and the rear end of which is open, the front end of the said slot communicating with the said recess 4.

I combine with the shoe a supporting-arm 6, the front end of which is provided with a shank 10, the sides of which converge forwardly, as shown, and at the front end of the said shank is formed a knob 5, which is of the form shown in Fig. 3 and is adapted to be socketed in the recess 4 of the shoe to effect a knuckle-joint connection between the shoe and the front end of the said supporting-arm 6, whereby the said shoe is adapted to rock in a vertical plane to adapt itself to inequalities in the surface of the soil as the machine advances, the said shoe being thus flexibly attached to the front end of the said supporting-arm. The slot $4^a$ in the shoe receives the shank 10 of the supporting-arm. At the rear end of the supporting-arm 6 are forked arms 7 8, which are approximately parallel and are disposed, respectively, above and below the cutting apparatus of the mowing-machine and transversely with relation thereto, as shown in Fig. 4, the forked arm 7 being above and extending over the cutter-bar and the arm 8 extending under the finger-bar. The said arm 6 is disposed in the same vertical plane with the finger $b$ of the cutting apparatus, the front end of the finger being received in a recess 11, with which that portion of the arm 6 between the forks 7 and 8 is provided. The said forks 7 and 8 are provided with slots 9, which extend in rear of the cutting apparatus and in which operates a bolt 12, that serves to secure the said forks to the cutting apparatus, as shown, and to dispose and maintain the arm 6 in the required position on the cutting apparatus.

In practice I employ as many of my improved attachments in connection with a mowing-machine as there are fingers on the finger-bar of the mowing-machine.

The operation of my invention will be readily understood from the foregoing description and by reference to the drawings. The shoes 1 and arm 6 adapt the cutting apparatus to run low only a slight distance above the ground. The shoes which operate in advance of the cutting apparatus divide the vines in advance of the fingers and cutter-plates, and the arms $a$ lift the vines from the ground and maintain them in such position that the stems thereof are approximately vertical when engaged by the cutting apparatus and are hence readily mowed by the machine.

To retain the connection between the shoe and the supporting-arm 6, I provide a cap-plate 9ª, which is screwed to the upper side of the shoe and bears upon the upper side of the knob 5, thereby maintaining the latter in its socket. It will be observed by reference to Fig. 2 that the height of the said knob is not equal to that of the recess 5, in which it is socketed, and hence the shoe 1 is adapted to play vertically to some extent independently of the supporting-arm 6.

Having thus described my invention, I claim—

1. A vine-lifting attachment for mowing-machines comprising a supporting-arm bifurcated to form rearwardly-extending upper and lower arms adapted to extend respectively above and below the cutting apparatus, said arms being provided with slots 9, for the purpose set forth, the front end of said arm being provided with a forwardly-extending shank having a knob at its front end, in combination with a shoe having a socket to receive the said knob and a slot to receive said shank, a lifting-arm attached to the said shoe, and a cap-plate secured on said shoe and bearing on said knob, substantially as described.

2. In a vine-lifting attachment for mowing-machines, the combination of a supporting-arm adapted to be secured to the cutting apparatus of a mower, and having a forwardly-extending shank, the sides of which converge forwardly and a knob of approximately cylindrical form at the front end of said shank, in combination with a shoe having a rearwardly-opening slot in its upper side to receive said shank and a recess at the front end of said slot forming the socket for the knob of said supporting-arm and a lifting-bar on and carried by the front portion of said shoe, substantially as described.

In testimony whereof I affix my signature in presence of two witnesses.

his
CHARLES  X  HERMANN.
                   mark

Witnesses:
  JACOB DEHOS,
  H. M. MCNALLY.